United States Patent
Korangy et al.

(10) Patent No.: US 9,338,226 B2
(45) Date of Patent: May 10, 2016

(54) ACTOR SYSTEM AND METHOD FOR ANALYTICS AND PROCESSING OF BIG DATA

(71) Applicants: Fred Korangy, Annapolis, MD (US); Hamed Ghasemzadeh, Tehran (IR); Mohsen Arjmandi, Tehran (IR); Reza Azmi, Tehran (IR)

(72) Inventors: Fred Korangy, Annapolis, MD (US); Hamed Ghasemzadeh, Tehran (IR); Mohsen Arjmandi, Tehran (IR); Reza Azmi, Tehran (IR)

(*) Notice: Subject to any disclaimer, the term of this patent is extended or adjusted under 35 U.S.C. 154(b) by 151 days.

(21) Appl. No.: 14/457,153

(22) Filed: Aug. 12, 2014

(65) Prior Publication Data

US 2014/0379775 A1    Dec. 25, 2014

Related U.S. Application Data

(60) Provisional application No. 61/864,682, filed on Aug. 12, 2013.

(51) Int. Cl.
| | | |
|---|---|---|
| *G06F 15/173* | (2006.01) | |
| *H04L 29/08* | (2006.01) | |
| *H04L 12/24* | (2006.01) | |
| *G06Q 10/00* | (2012.01) | |
| *G06F 9/50* | (2006.01) | |

(52) U.S. Cl.
CPC .......... *H04L 67/1002* (2013.01); *G06F 9/5083* (2013.01); *G06Q 10/00* (2013.01); *H04L 41/5019* (2013.01)

(58) Field of Classification Search
CPC .............. H04L 29/08144; H04L 29/06; H04L 29/08072; H04L 29/08171; H04L 12/5695; H04L 43/00; H04L 12/2602; H04L 41/22
USPC .......................................................... 709/226
See application file for complete search history.

(56) References Cited

U.S. PATENT DOCUMENTS

| | | | | |
|---|---|---|---|---|
| 7,107,426 B2* | 9/2006 | Kolodner | ............... | G06F 9/5016 707/999.202 |
| 8,997,226 B1* | 3/2015 | Call | ....................... | G06F 21/552 709/224 |
| 2002/0056019 A1* | 5/2002 | Kolodner | ............... | G06F 9/5016 711/6 |
| 2012/0209901 A1* | 8/2012 | Xu | .......................... | G06F 9/505 709/201 |
| 2013/0042003 A1* | 2/2013 | Franco | ................ | H04L 67/1097 709/226 |
| 2014/0164285 A1* | 6/2014 | Ashburn | ................ | G06Q 40/06 705/36 R |
| 2014/0379775 A1* | 12/2014 | Korangy | ............. | H04L 67/1002 709/201 |
| 2015/0089231 A1* | 3/2015 | Oxford | ................. | H04L 9/0869 713/171 |

(Continued)

*Primary Examiner* — Emmanuel L Moise
*Assistant Examiner* — Mahran Abu Roumi
(74) *Attorney, Agent, or Firm* — Barry Choobin; Patent 360

(57) ABSTRACT

The embodiments herein provide a system architecture, application model and methods to write Big Data programs using actor systems and asynchronous messaging middleware akka and scala language. The system comprises an actor network connected to a cloud network and to a distributed virtual machine (DVM) network. The actors are connected respectively to the DVMs based on a predefined protocol. A scheduler is provided to schedule the resources to an actor in the actor network. A stop and start mechanism is provided to change a connection between the actors and the DVMs. The system server sends a message to the actor to disconnect an actor connected to one DVM and to connect the actor to another DVM based on a load of a process agent present in each DVM to balance a load on the actor. The system server adds three fundamental operations over actor systems.

14 Claims, 5 Drawing Sheets

(56) References Cited

U.S. PATENT DOCUMENTS

| | | | |
|---|---|---|---|
| 2015/0106511 A1* | 4/2015 | Astigarraga | H04L 43/16 709/224 |
| 2015/0128121 A1* | 5/2015 | Garcia | G06F 8/65 717/170 |
| 2015/0293755 A1* | 10/2015 | Robins | G06F 8/60 717/104 |
| 2015/0326939 A1* | 11/2015 | Dieselberg | H04N 21/6125 725/109 |
| 2016/0062741 A1* | 3/2016 | Jayaraman | G06F 11/3604 717/110 |

* cited by examiner

ACTOR SYSTEM AND METHOD FOR ANALYTICS AND PROCESSING OF BIG DATA

CROSS-REFERENCE TO RELATED APPLICATION

The present application claims the priority of the U.S. Provisional Patent of Application with Ser. No. 61/864,682 filed on Aug. 12, 2013 with the title and the contents of which are incorporated by reference herein.

BACKGROUND

1. Technical Field

The embodiments herein are generally related to data processing and analytics system and particularly related to a system and method for Big Data processing and analytics. The embodiments herein are more particularly related to an actor oriented system or platform or application model and a method for Big Data processing and analytics.

2. Description of the Related Art

Big Data is a large data set that is distributed over a set of storages. A typical problem is to find actionable insights. The data may be stored beforehand or may be a continuous stream to be accessed, stored and analyzed with distributed algorithms and frameworks. The Big Data analytics inherently requires a set of distributed computing, networking and storage resources that may be available locally or rented from a cloud infrastructure. In this manner, a Big Data is related to cloud computing. The ultimate objective of Big Data market is to gain an effective advantage in terms of time and cost or more convenient and easier to use system to handle processing of large data assets using an efficient software stack and hardware platform.

The Big Data have different forms such as unstructured data and semi-structured data like machine logs, text documents and media frames. The Big Data includes any data that is not relationally structured over managed tables and pre-defined data schemas in dedicated database systems. Simply the Big Data is a distributed data set that is not stored in a database. This definition even includes relations between database tuples that are not stored directly using foreign keys. Mining such relations is also a problem with respect to Big Data. A set of sample problems with respect to Big Data includes a monitoring of all data on a network to guard against cyber security attacks, a monitoring of social media outlets for trends and patterns, analyzing current and historical customer transaction data from various sources to detect fraud patterns or opportunities during the lifetime cycle of a customer, generation of various algorithms to stay current on large volumes of information, running of highly complex data queries on transaction data to see past and present patterns, predicting behavior and patterns leveraging current and historical data, a monitoring of transactions and fraud rings, managing and analyzing the flow of people, business and assets from various data sources, managing and analyzing the flow of information to find trends or key words in conversations, documents, news articles, social media outlets to fulfill National Security Missions, incorporating other data sources such as news, weather, stock information into scenarios for better predictions, performing entity identification and disambiguation automatically for modeling, running highly complex data queries on transaction data (years, months, decades) to see past and present patterns in governmental data, combinational processing of variety of data sources to study patterns and to predict based on the patterns, managing patient transaction data on electronic medical records including medical information, medical procedures and prescriptions, capturing and analyzing information from all branches of stores, locations and departments, analyzing information from different sources such as stores and sensor devices for managing pricing, inventory and distribution operations, processing customer data such as billions of call records, texts, streaming media, and GPS history, customer churn, usage behavior patterns, and failure or dropped call for prevention, frequent caller data for planning cross- and up-sell strategies; selecting easy steps to access, visualize and explore Data, getting an integrated, strategic view across multiple operational systems, measuring and optimizing agent performance, customer satisfaction, and marketing ROI; real time monitoring of large distributed systems, processing complete rich streams of social networking data, real time analysis on log information generated from widely distributed systems, and statistical analysis on real-time vehicle traffic information on a global basis.

The consumer product companies and retail organizations monitor social media like Face book and Twitter to get an unprecedented view into customer behavior, preferences, and product perception. The manufacturers monitor a minute vibration data from their equipments, which changes slightly as it wears down, to predict the optimal time to replace or maintain the equipments or devices. The manufacturers use the monitored data to detect aftermarket support issues before a warranty failure becomes publicly detrimental. The Financial Services organizations uses the data mined from customer interactions to slice and dice their users into finely tuned segments. This enables the financial institutions to create increasingly relevant and sophisticated offers. The advertising and marketing agencies track social media to understand responsiveness to campaigns, promotions, and other advertising mediums. The insurance companies can judge the home insurance applications to be immediately processed. The retail organizations sell their products to brand advocates and enthusiastic customers by changing the perception of brand antagonists, and by embracing social media. The hospitals predict those patients that are likely to seek readmission by analyzing the patient records. The appealing recommendations and more successful coupon programs can be generated for web-based businesses. The government makes a data public to develop new applications. The team strategies for sports teams are estimated or planned by tracking the ticket sales data.

The abovementioned variety of Big Data problems has created a driving and differentiating force for a large set of products regarding Big Data and high throughput stream processing. A rapid growth in the market is another cause for diversity of tools and products between the competitors. Differentiating factors for the product and services resides on three levels as framework, distribution, and packaging competing factors. On the other hand, some shared quality features are prevalent in outstanding competitors such as fault tolerance, large storage capacity, scalability, extensibility, cluster management for enterprise applications.

Hence there is a need for a system and method for analyzing and processing Big Data using actor systems. Further there is a need for an application model and methods to write Big Data programs using actor systems. Still further there is a need for developing an application model using runtime actor systems, asynchronous messaging, event driven middleware and a scalable general purpose language. Yet there is a need for a distributed processing system for connecting, organizing and balancing to realize a set of chained processes acting on a distributed Big Data.

The above mentioned shortcomings, disadvantages and problems are addressed herein and which will be understood by reading and studying the following specification.

OBJECTIVES OF THE EMBODIMENTS

A primary object of the embodiments herein is to develop a system architecture, application model and method for analyzing and processing Big Data using actor systems.

Another object of the embodiments herein is to develop an application model and methods to write Big Data programs using actor systems.

Yet another object of the embodiments herein is to develop an application model using runtime actor systems, asynchronous messaging, event driven middleware and a scalable general purpose language.

Yet another object of the embodiments herein is to develop a distributed processing system for connecting, organizing and balancing to realize a set of chained processes acting on a distributed Big Data.

Yet another object of the embodiments herein is to develop a system architecture, application model and methods to write Big Data programs using actor systems and asynchronous messaging middleware using akka and scala language.

Yet another object of the embodiments herein is to develop distributed processes that are connected, organized, and balanced, to realize a set of chained processes acting on a distributed Big Data.

Yet another object of the embodiments herein is to develop a system to manage, schedule, provide resources and enable messaging for asynchronous actors.

Yet another object of the embodiments herein is to develop a system that utilizes actors as application sub processes to create a distributed data processor.

Yet another object of the embodiments herein is to develop a system that uses functional programming and scala to realize perform/transform and balance operations over actor systems.

Yet another object of the embodiments herein is to develop a system to adjust and change cluster instance locations based on utilization criteria asynchronously on demand.

Yet another object of the embodiments herein is to develop a system to create a platform instance within existing Distributed Virtual Machines (DVM)s to balance load and increase utilization factor.

Yet another object of the embodiments herein is to develop an actor based system that supports asynchronous process composition using dynamic binding of data actors through standard message passing interfaces.

Yet another object of the embodiments herein is to develop a system to provide an opportunity to reuse running data actors for several applications.

Yet another object of the embodiments herein is to develop a system and method to reuse filtering and normalization Map/Reduce phases for Big Data streams on runtime.

Yet another object of the embodiments herein is to develop a system and method to schedule a concurrent use for multi user environments with process composition graph.

Yet another object of the embodiments herein is to develop a system and method to provide a self-healing mechanism using substitutable process blocks and polymorphic interfaces for process structuring.

Yet another object of the embodiments herein is to develop a system and method to carry out process versioning and name resolution techniques for flexible runtime configuration.

Yet another object of the embodiments herein is to develop a system and method to enable transparent changes, addition, modification update of a process composition graph at runtime.

Yet another object of the embodiments herein is to develop a system and method to provide a platform to manage fully asynchronous concurrent actor systems locally or remotely instead of tasks and workers paradigm.

These and other objects and advantages of the embodiments herein will become readily apparent from the following detailed description taken in conjunction with the accompanying drawings.

SUMMARY

The various embodiments herein provide a system architecture, application model and methods to write Big Data programs using actor systems and asynchronous messaging middleware akka and scala language. The system and method provides distributed processes that are connected, organized and balanced, to realize a set of chained processes acting on a distributed Big Data. The system manages, schedules, provides resources and enables messaging for asynchronous actors. The system utilizes actors as application sub processors to create a distributed data processor. The system provides an efficient answer for the problem in Big Data Processing operations.

According to an embodiment herein, a system with actor oriented platform is provided for Big Data processing and analytics. According to an embodiment herein, the system comprises an actor network connected to a cloud server in a cloud network, and wherein the actor network comprises a plurality of actors. A distributed virtual machine (DVM) network is connected to the actor network, and wherein the DVM network comprises a plurality of DVMs, and wherein the plurality of actors is connected respectively to the plurality of DVMs based on a predefined protocol, A system server is connected to the cloud server, the actor network and the DVM network. A scheduler is provided in the system server to schedule the resources connected to an actor in the actor network. A stop and start mechanism is provided in the server to change a connection between the plurality of actors and the plurality of DVMs. A cloud balancer is provided in the server and connected to the actor in the actor network. The system server sends a message to the actor to disconnect an actor connected to one DVM and to connect the actor to another DVM based on a load of a process agent present in each DVM to balance a load on the actor.

According to an embodiment herein, the system server throttles a message queue of an actor to reduce a load on the actor or to enhance the message queue to increase load on the actor.

According to an embodiment herein, the scheduler plays a middleware role to synchronously manage a cellular architecture and the actor system, and wherein the cellular architecture is formed with the actor system and the DVM system.

According to an embodiment herein, the stop and start mechanism is operated to stop an operation of a process agent in a first DVM and to start an operation of a process agent in a second DVM, when the process agent in the first DVM consumes extra resources, and wherein the start and stop mechanism is operated to execute a cloud balancer application platform to provide a first command to the first DVM to stop the operation of the process agent in the first DVM and a second command to the second DVM to start the operation of the second DVM.

According to an embodiment herein, the system server adds three fundamental operations over actor systems to manage schedules, to provide resources and to enable messaging for an asynchronous set of actors in the actor network, and wherein the three fundamental operations includes Perform, Transform and Balance (PTB) operations, and wherein the actors are organized in Actor Sets to realize a protocol, application or data operators that are connected to other actors based on a process composition defined by the PTB operations, and wherein the Perform operation is added to realizes a continuous message routing service, and wherein the Transfer operation is added to define a piped topology and interconnection of two actors in the actor system to provide a continuous service, and wherein the Balance operation is added to define a separation paradigm of service results, and wherein the server uses functional programming and scala to realize perform, transform and balance operations over actor systems.

According to an embodiment herein, the scheduler plays a middleware role to synchronously manage an underlying cellular architecture and an overlying actor system.

According to an embodiment herein, a computer implemented method is provided and executed on a computing device to perform Big Data processing in a system with actor oriented platform. According to an embodiment herein, the method comprises establishing an actor network with a plurality of actors and connecting the actor network to a cloud server in a cloud network. A distributed virtual machine (DVM) network is established with a plurality of DVMs and the DVM network is connected to the actor network, and wherein the plurality of actors is connected respectively to the plurality of DVMs based on a predefined protocol. A plurality of resources connected to an actor in the actor network is scheduled by using a scheduler provided in the system server. A connection between the plurality of actors and the plurality of DVMs is changed with a stop and start mechanism provided in the server. A load on the actor is balanced with a cloud balancer provided in the server and wherein the cloud balancer is connected to the actor in the actor network. Three fundamental operations are added over the actor systems using a system server to manage schedules, to provide resources and to enable messaging for an asynchronous set of actors in the actor network.

According to an embodiment herein, the three fundamental operations includes Perform, Transform and Balance (PTB) operations, and wherein the actors are organized in Actor Sets to realize a protocol, application or data operators that are connected to other actors based on a process composition defined by the PTB operations, and wherein the Perform operation is added to realizes a continuous message routing service, and wherein the Transfer operation is added to define a piped topology and interconnection of two actors in the actor system to provide a continuous service, and wherein the Balance operation is added to define a separation paradigm of service results, and wherein the server uses functional programming and scala to realize perform, transform and balance operations over actor systems.

According to an embodiment herein, the method further comprises sending a message to the actor the system server to disconnect an actor connected to one DVM and to connect the actor to another DVM based on a load of a process agent present in each DVM to balance a load on the actor.

According to an embodiment herein, the method further comprises throttling a message queue of an actor to reduce a load on the actor or to enhance the message queue to increase load on the actor using a scheduler.

According to an embodiment herein, a middleware is created by the scheduler to synchronously manage a cellular architecture and the actor system, and wherein the cellular architecture is formed with the actor system and the DVM system.

According to an embodiment herein, the method further comprises executing cloud balancer application to stop an operation of a process agent in a first DVM and to start an operation of a process agent in a second DVM, when the process agent in the first DVM consumes extra resources, and wherein the cloud balancer application is executed to provide a first command to the first DVM to stop the operation of the process agent in the first DVM and a second command to the second DVM to start the operation of the second DVM.

According to an embodiment herein, the method further comprises generating a clustered platform using virtualization technologies and a plurality of DVMs.

According to an embodiment herein, the method further comprises implementing the DVMs using a cluster topology management protocol (CTPM) for every platform instance.

According to an embodiment herein, each actor is disconnect from a respective DVM and connected another DVM to adjust and change cluster instance locations asynchronously on demand based on utilization criteria.

According to an embodiment herein, the method further comprises creating a platform instance within existing DVMs to balance load and increase utilization factor.

According to an embodiment herein, wherein the actor is created to use a plurality of topologies.

According to an embodiment herein, the method further comprises attaching a process agent to a topology map based on a role of the process agent, and wherein the process agent chooses a role to attach to a topology map.

According to an embodiment herein, the system adds three fundamental operations over actor systems and the three fundamental operations are Perform/Transform/Balance (PTB) operations. The data actors are organized in Actor Sets realizing a protocol, application or the data operators that are connected to other actors according to the PTB operations defined by a process composition. The Perform operation realizes a continuous service. The Transfer operation defines a piped topology and interconnection of two actor systems that provide a service continuously. The Balance operation defines a separation paradigm of service results. A large process includes a set of Perform/Transform/Balance operations over the actor sets to realize a complete service that is continuous and message passing oriented. The service is a continuous message routing oriented service. The system uses a functional programming and scala to realize perform/transform and balance operations over the actor systems.

According to an embodiment herein, the system pushes cloud awareness or connects the cloud layer to the actor layer to schedule the resources more flexibly. The system uses message routing as the method to balance the loads over the data actors. The method is used to throttle a message queue of an actor to reduce a load or to boost or enhance the message queue to increase the load on the actor. The scheduler plays a middleware role to synchronously manage the underlying cellular architecture and the overlay actor system. The cellular architecture method is to abstract a clustered platform by using the conventional virtualization technologies and a set of interrelated virtual machines namely Distributed Virtual Machines (DVM)s. Each DVM is a part of a set of virtual machines. Each DVM forms a part of a DVM network. The DVMs in the network are operated or deployed or implemented using a cluster topology management protocol (CTPM) for every platform instance.

According to an embodiment herein, a method for rebalancing the cloud is not done or executed through the migration of a virtual machine or DVM but is done through actor stop and start mechanism over DVMs. The stop and start mechanism is activated and executed in DVM such that the cloud balancer, as an application on the platform itself, stops a process agent in one DVM and signals another machine (DVM) to instantiate the process agent again when a process agent uses or consumes extra resources. The start and stop mechanism is an application run on the DVM. This model eliminates the need to migrate virtual machine images or processes among DVM. Each actor in this system is prepared or configured to disconnect from one partner and join or connect to another partner to perform or receive the desired service. So the underlying layer is capable of adjusting and changing the cluster instance locations asynchronously based on utilization criteria on demand. The system creates a platform instance within existing DVMs to balance a load and increase a utilization factor. The other way is to increase an association between the respective computing machines or DVM machines.

An actor involves or deploys or includes different topologies. The method to attach an agent to a topology map is a role based process. An agent chooses a role to attach itself to a topology and dependent roles are resolved through a distributed naming service to manage runtime process architectures more flexibly or dynamically. The dynamic topology mapping or management gives an opportunity to an application to choose the run time structuring method of its processes according to the usage environment.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
FIG. 1 illustrates a schematic diagram of a system architecture for a system with actor oriented platform for Big Data processing and analytics, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system architecture, application model and methods to write Big Data programs using actor systems and asynchronous messaging middleware akka and scala language. The system and method provides distributed processes that are connected, organized and balanced, to realize a set of chained processes acting on a distributed Big Data. The system manages, schedules, provides resources and enables messaging for asynchronous actors. The system utilizes actors as application sub processors to create a distributed data processor. The system provides an efficient answer for the problem in Big Data Processing operations.

According to an embodiment herein, a system with actor oriented platform is provided for Big Data processing and analytics. According to an embodiment herein, the system comprises an actor network connected to a cloud server in a cloud network, and wherein the actor network comprises a plurality of actors. A distributed virtual machine (DVM) network is connected to the actor network, and wherein the DVM network comprises a plurality of DVMs, and wherein the plurality of actors is connected respectively to the plurality of DVMs based on a predefined protocol, A system server is connected to the cloud server, the actor network and the DVM network. A scheduler is provided in the system server to schedule the resources connected to an actor in the actor network. A stop and start mechanism is provided in the server to change a connection between the plurality of actors and the plurality of DVMs. A cloud balancer is provided in the server and connected to the actor in the actor network. The system server sends a message to the actor to disconnect an actor connected to one DVM and to connect the actor to another DVM based on a load of a process agent present in each DVM to balance a load on the actor.

According to an embodiment herein, the system server throttles a message queue of an actor to reduce a load on the actor or to enhance the message queue to increase load on the actor.

According to an embodiment herein, the scheduler plays a middleware role to synchronously manage a cellular architecture and the actor system, and wherein the cellular architecture is formed with the actor system and the DVM system.

According to an embodiment herein, the stop and start mechanism is operated to stop an operation of a process agent in a first DVM and to start an operation of a process agent in a second DVM, when the process agent in the first DVM consumes extra resources, and wherein the start and stop mechanism is operated to execute a cloud balancer application platform to provide a first command to the first DVM to stop the operation of the process agent in the first DVM and a second command to the second DVM to start the operation of the second DVM.

According to an embodiment herein, the system server adds three fundamental operations over actor systems to manage schedules, to provide resources and to enable messaging for an asynchronous set of actors in the actor network, and wherein the three fundamental operations includes Perform, Transform and Balance (PTB) operations, and wherein the actors are organized in Actor Sets to realize a protocol, application or data operators that are connected to other actors based on a process composition defined by the PTB operations, and wherein the Perform operation is added to realizes a continuous message routing service, and wherein the Transfer operation is added to define a piped topology and interconnection of two actors in the actor system to provide a continuous service, and wherein the Balance operation is added to define a separation paradigm of service results, and wherein the server uses functional programming and scala to realize perform, transform and balance operations over actor systems.

According to an embodiment herein, the scheduler plays a middleware role to synchronously manage an underlying cellular architecture and an overlying actor system.

According to an embodiment herein, a computer implemented method is provided and executed on a computing device to perform Big Data processing in a system with actor oriented platform. According to an embodiment herein, the method comprises establishing an actor network with a plurality of actors and connecting the actor network to a cloud server in a cloud network. A distributed virtual machine (DVM) network is established with a plurality of DVMs and the DVM network is connected to the actor network, and wherein the plurality of actors is connected respectively to the plurality of DVMs based on a predefined protocol. A plurality of resources connected to an actor in the actor network is scheduled by using a scheduler provided in the system server. A connection between the plurality of actors and the plurality of DVMs is changed with a stop and start mechanism provided in the server. A load on the actor is balanced with a cloud balancer provided in the server and wherein the cloud balancer is connected to the actor in the actor network. Three fundamental operations are added over the actor systems using a system server to manage schedules, to provide resources and to enable messaging for an asynchronous set of actors in the actor network.

According to an embodiment herein, the three fundamental operations includes Perform, Transform and Balance (PTB) operations, and wherein the actors are organized in Actor Sets to realize a protocol, application or data operators that are connected to other actors based on a process composition defined by the PTB operations, and wherein the Perform operation is added to realizes a continuous message routing service, and wherein the Transfer operation is added to define a piped topology and interconnection of two actors in the actor system to provide a continuous service, and wherein the Balance operation is added to define a separation paradigm of service results, and wherein the server uses functional programming and scala to realize perform, transform and balance operations over actor systems.

According to an embodiment herein, the method further comprises sending a message to the actor the system server to disconnect an actor connected to one DVM and to connect the actor to another DVM based on a load of a process agent present in each DVM to balance a load on the actor.

According to an embodiment herein, the method further comprises throttling a message queue of an actor to reduce a load on the actor or to enhance the message queue to increase load on the actor using a scheduler.

According to an embodiment herein, a middleware is created by the scheduler to synchronously manage a cellular architecture and the actor system, and wherein the cellular architecture is formed with the actor system and the DVM system.

According to an embodiment herein, the method further comprises executing cloud balancer application to stop an operation of a process agent in a first DVM and to start an operation of a process agent in a second DVM, when the process agent in the first DVM consumes extra resources, and wherein the cloud balancer application is executed to provide a first command to the first DVM to stop the operation of the process agent in the first DVM and a second command to the second DVM to start the operation of the second DVM.

According to an embodiment herein, the method further comprises generating a clustered platform using virtualization technologies and a plurality of DVMs.

According to an embodiment herein, the method further comprises implementing the DVMs using a cluster topology management protocol (CTPM) for every platform instance.

According to an embodiment herein, each actor is disconnect from a respective DVM and connected another DVM to adjust and change cluster instance locations asynchronously on demand based on utilization criteria.

According to an embodiment herein, the method further comprises creating a platform instance within existing DVMs to balance load and increase utilization factor.

According to an embodiment herein, wherein the actor is created to use a plurality of topologies.

According to an embodiment herein, the method further comprises attaching a process agent to a topology map based on a role of the process agent, and wherein the process agent chooses a role to attach to a topology map.

The various embodiments herein provide a system architecture, application model and methods to write Big Data programs using actor systems and asynchronous messaging middleware akka and scala language. The system and method provides distributed processes that are connected, organized and balanced, to realize a set of chained processes acting on a distributed Big Data. The system manages, schedules, provides resources and enables messaging for asynchronous actors. The system utilizes actors as application sub processors to create a distributed data processor. The system provides an efficient answer for the problem in Big Data Processing operations.

According to an embodiment herein, the system adds three fundamental operations over actor systems and the three fundamental operations are Perform/Transform/Balance (PTB) operations. The data actors are organized in Actor Sets realizing a protocol, application or the data operators that are connected to other actors according to the PTB operations defined by a process composition. The Perform operation realizes a continuous service. The Transfer operation defines a piped topology and interconnection of two actor systems that provide a service continuously. The Balance operation defines a separation paradigm of service results. A large process includes a set of Perform/Transform/Balance operations over the actor sets to realize a complete service that is continuous and message passing oriented. The service is a continuous message routing oriented service. The system uses a functional programming and scala to realize perform/transform and balance operations over the actor systems.

According to an embodiment herein, the system pushes cloud awareness or connects the cloud layer to the actor layer to schedule the resources more flexibly. The system uses message routing as the method to balance the loads over the data actors. The method is used to throttle a message queue of an actor to reduce a load or to boost or enhance the message queue to increase the load on the actor. The scheduler plays a middleware role to synchronously manage the underlying cellular architecture and the overlay actor system. The cellular architecture method is to abstract a clustered platform by using the conventional virtualization technologies and a set of interrelated virtual machines namely Distributed Virtual Machines (DVM)s. Each DVM is a part of a set of virtual machines. Each DVM forms a part of a DVM network. The DVMs in the network are operated or deployed or implemented using a cluster topology management protocol (CTPM) for every platform instance.

According to an embodiment herein, a method for rebalancing the cloud is not done or executed through the migration of a virtual machine or DVM but is done through actor stop and start mechanism over DVMs. The stop and start mechanism is activated and executed in DVM such that the cloud balancer, as an application on the platform itself, stops a process agent in one DVM and signals another machine (DVM) to instantiate the process agent again when a process agent uses or consumes extra resources. The start and stop mechanism is an application run on the DVM. This model eliminates the need to migrate virtual machine images or processes among DVM. Each actor in this system is prepared or configured to disconnect from one partner and join or connect to another partner to perform or receive the desired service. So the underlying layer is capable of adjusting and changing the cluster instance locations asynchronously based on utilization criteria on demand. The system creates a platform instance within existing DVMs to balance a load and increase a utilization factor. The other way is to increase an association between the respective computing machines or DVM machines.

An actor involves or deploys or includes different topologies. The method to attach an agent to a topology map is a role based process. An agent chooses a role to attach itself to a topology and dependent roles are resolved through a distributed naming service to manage runtime process architectures more flexibly or dynamically. The dynamic topology mapping or management gives an opportunity to an application to choose the run time structuring method of its processes according to the usage environment.

The system is configured or designed or adopted to manage schedules, provide resources and to enable messaging for an asynchronous set actors. The system utilizes actors as application sub processes to create a distributed data processing operation. The system provides an effective, efficient and scalable answer for the problems in the Big Data Processing operations.

The System adds three fundamental operations to the actor systems and the three operations are the Perform/Transform/Balance (PTB) operations. The Data actors are organized in Actor Sets to realize or achieve a protocol, application or data operators that are connected to other actors according to the process composition defined PTB operations. The Perform operation realizes a continuous service. The Transfer operation defines a piped topology environment and interconnection of two actor system to provide a service continuously. The Balance operation defines a separation paradigm or ground for service results. A large processing operation includes a set of Perform/Transform/Balance operations over actor sets to realize a complete service that is continuous message routing oriented service. The system uses functional programming and scala to realize perform/transform and balance operations over the actor systems.

The system connects or pushes data from a cloud layer to the actor layer to schedule resources more flexibly or dynamically. The system uses message routing as the method to balance the loads over a plurality of data actors. The load balancing method is executed by throttling the message queue of an actor to reduce the load or by enhancing or increasing the message queue to increase a load on the actor. The scheduler plays a middleware role to synchronously manage the underlying cellular architecture and the overlay actor system. The cellular architecture method is executed to abstract a clustered platform using conventional virtualization technologies and a set of interrelated virtual machines such as DVMs. Each DVM forms a part of a set of virtual machines or a virtual machines network such as DVM network. The method uses a cluster topology management protocol (CTPM) to implement DVMs for every platform instance or the DVMs are implemented or operated for every platform instance using a cluster topology management protocol (CTPM)

The method of rebalancing the cloud is not done through a migration of virtual machine, but is done through a stop and start mechanism of actors in DVMs. The stop and start mechanism is a cloud balancer application run on DVMs so that the cloud balancer application is run on the platform itself to stops an operation of a process agent in one DVM and signals another DVM to instantiate the agent again when a process agent uses extra or additional resources. This model eliminates the need to migrate virtual machine images. Each actor in this system is configured and adopted to disconnect from one partner and connect with another partner to perform or receive the required service. So the underlying layer is capable of adjusting and changing the cluster instance locations asynchronously based on the utilization criteria on demand. The system creates a platform instance within existing DVMs to balance load and increase a utilization factor. The other way is to increase association between the DVM machines belonging to the actor systems.

An actor is capable of deploying or including different topologies. The method to attach an agent to a topology map is a role based process or operation. An agent is attached to a topology map based on the role of the agent. An agent chooses a role to attach itself to a topology and the dependent roles of an agent are resolved through a distributed naming service to manage the runtime process architectures more flexibly or dynamically. The topology dynamism gives an opportunity to an application layer to choose a run time structuring method of the processes according to a usage environment.

The proposed Actor based system supports asynchronous process composition using dynamic binding of the data actors through a standard message passing or routing interfaces. The Process compositions require flexible interface connectivity, a communication transparency and also a dynamic routing configuration between the subsystems. This system uses a process dependency definition to define or estimate the runtime process dependencies. The interfaces have specifications to be shared and accessed independently to the actual implementation anywhere and anytime asynchronously with a dependent actor.

The real world deployments of big data analytics have demonstrated that several map-reduce jobs are needed to get the desired results from a big data. The recently available products such as cascading, try to solve the problem of task management for Hadoop and legacy software stacks of Big Data processing. The product disclosed in the embodiments herein gives an opportunity to reuse the running data actors for several applications.

The multistep processes are derived from a set of consecutive Map Reduce tasks. When the data actors go up, the multistep process seeks for or requires module dependencies and process dependencies too. The multistep processes tries to find required code blocks for execution (Like Hadoop) beside that the multistep processes try to find the process constituents. The multistep processes bind class interfaces and also the messaging interfaces to current topology of the system to reduce process duplication.

The examples of multi processes includes but not limited to reuse filtering and normalization Map/Reduce phases for Big Data streams on runtime; scheduling of concurrent use for multi user environments with process composition graph; self-healing mechanism using substitutable process blocks and polymorphic interfaces for process structuring; process versioning and name resolution techniques for flexible runtime configuration; transparent changes such as addition, modification update of a process composition graph at runtime The processes are protocol abstraction and active agents passing asynchronous control or data messages. A task is a set of procedures to fetch an input data to produce the results of computation. A task has not enough flexibility to become continuous and need additional features and endorsements to gain such capability. The actors are process realization tools in the proposed system and a set of actor processes forms an actor system. An actor system is capable enough to run hadoop, spark and storm tasks without modification but the reverse is not true.

The platform manages fully asynchronous concurrent actor systems locally or remotely instead of tasks and workers paradigm. The actors are light-weight process-protocol abstractions capable of forking, expanding, relocating and stimulating themselves or other partners. The asynchronous nature of the system gives a higher level of parallelism through unmanaged flow of data between the data actors.

The actors collaborate for stream filtering, mapping and reduction for better concurrency. The processes are coordinated for efficient processing and concurrency. The processes are routed through messages for execution. The actor systems are useable in non-analytic applications such as software routing; communication oriented applications such as online short messaging service (sms) processing without storage; asynchronous and distributed communication to the external world; and flexible queue management. The actor systems throttle a processing upon request. The actor systems execute a load balancing with queue size management and adaptive congestion control. The load-balancing is performed through router integration as live application servers. The processing is centered and executed around the actors and not around jobs or tasks. Each actor does the same role or function as the other actors do. A Message assignment results on the actor loads; flexible abstraction: flexible messaging for designing tuple and page; and stream processing that continuously connects the application to the external world.

FIG. 1 illustrates a schematic diagram of a system architecture for a system with actor oriented platform for Big Data processing and analytics, according to an embodiment herein. With respect to FIG. 1, a system architecture, application model and methods to write Big Data programs using actor systems and asynchronous messaging middleware akka and scala language are provided. The system provides distributed processes that are connected, organized and balanced, to realize a set of chained processes acting on a distributed Big Data. The system manages, schedules, provides resources and enables messaging for asynchronous actors. The system utilizes actors as application sub processors to create a distributed data processor. The system provides an efficient answer for the problem in Big Data Processing operations.

Figure 2:
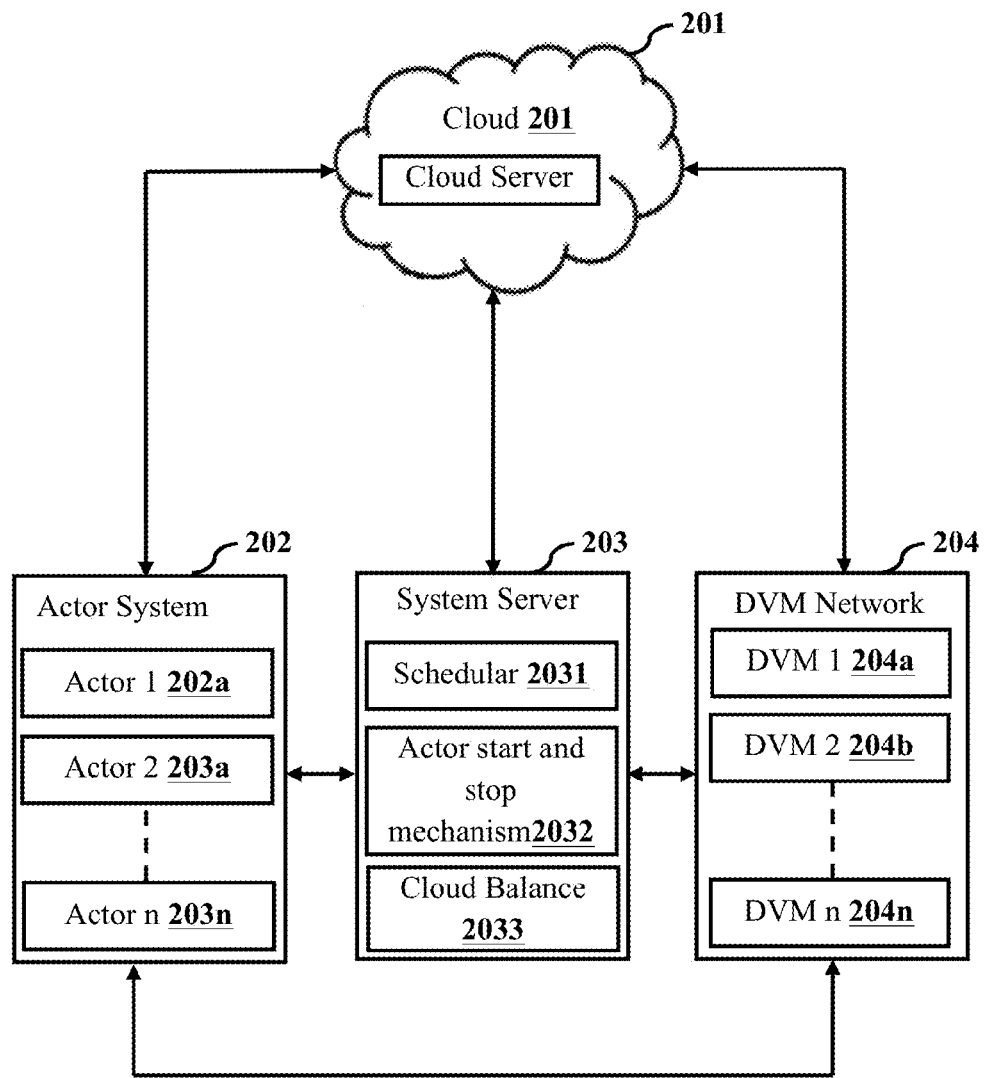
FIG. 2 illustrates a block diagram of a system with actor oriented platform for Big Data processing and analytics, according to an embodiment herein.

FIG. 2 illustrates a block diagram of a system with actor oriented platform for Big Data processing and analytics, according to an embodiment herein. With respect to FIG. 2, a system with actor oriented platform is provided for Big Data processing and analytics. The system comprises an actor network 202 connected to a cloud server 2011 in a cloud network 201, and wherein the actor network 202 comprises a plurality of actors 202a-202n. A distributed virtual machine (DVM) network 204 is connected to the actor network 202, and wherein the DVM network 204 comprises a plurality of DVMs 204a-204n, and wherein the plurality of actors 202a-202n is connected respectively to the plurality of DVMs 204a-204n based on a predefined protocol, A system server 203 is connected to the cloud server 2011, the actor network 202 and the DVM network 204. A scheduler 2031 is provided in the system server to schedule the resources connected to an actor in the actor network 202. A stop and start mechanism 2032 is provided in the server 203 to change a connection between the plurality of actors 202a-202n and the plurality of DVMs 204a-204n. A cloud balancer 2033 is provided in the server 203 and connected to the actor in the actor network 202. The system server 203 sends a message to the actor to disconnect an actor connected to one DVM and to connect the actor to another DVM based on a load of a process agent present in each DVM to balance a load on the actor.

The system server throttles a message queue of an actor to reduce a load on the actor or to enhance the message queue to increase load on the actor.

The scheduler plays a middleware role to synchronously manage a cellular architecture and the actor system, and wherein the cellular architecture is formed with the actor system and the DVM system.

The stop and start mechanism is operated to stop an operation of a process agent in a first DVM and to start an operation of a process agent in a second DVM, when the process agent in the first DVM consumes extra resources, and wherein the start and stop mechanism is operated to execute a cloud balancer application platform to provide a first command to the first DVM to stop the operation of the process agent in the first DVM and a second command to the second DVM to start the operation of the second DVM.

The system server adds three fundamental operations over actor systems to manage schedules, to provide resources and to enable messaging for an asynchronous set of actors in the actor network, and wherein the three fundamental operations includes Perform, Transform and Balance (PTB) operations, and wherein the actors are organized in Actor Sets to realize a protocol, application or data operators that are connected to other actors based on a process composition defined by the PTB operations, and wherein the Perform operation is added to realizes a continuous message routing service, and wherein the Transfer operation is added to define a piped topology and interconnection of two actors in the actor system to provide a continuous service, and wherein the Balance operation is added to define a separation paradigm of service results, and wherein the server uses functional programming and scala to realize perform, transform and balance operations over actor systems.

The scheduler plays a middleware role to synchronously manage an underlying cellular architecture and an overlying actor system.

Figure 3:
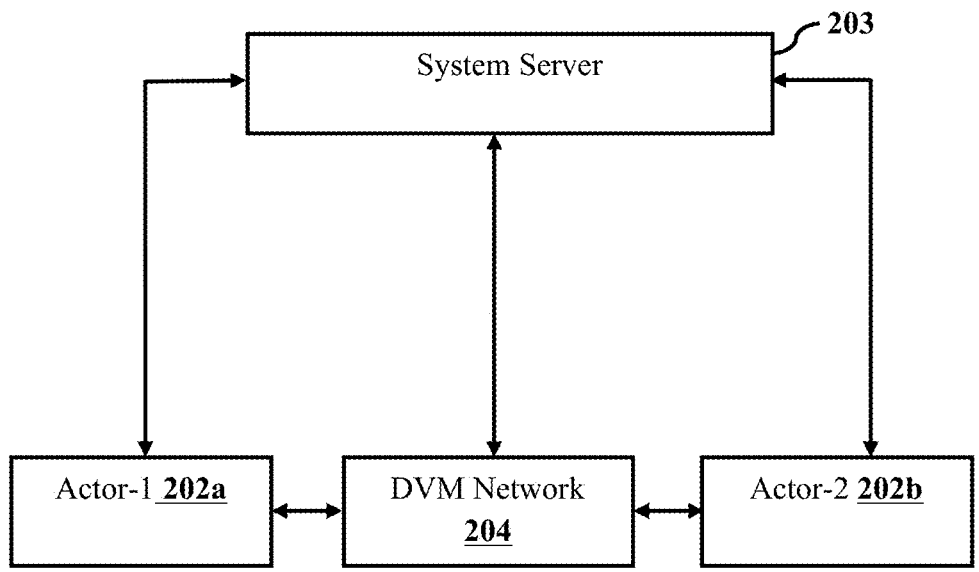
FIG. 3 illustrates a functional block diagram of a system with actor oriented platform for Big Data processing and analytics, according to an embodiment herein.

FIG. 3 illustrates a functional block diagram of a system with actor oriented platform for Big Data processing and analytics, according to an embodiment herein. With respect to FIG. 3, a system with actor oriented platform is provided for Big Data processing and analytics. The system comprises an actor network 202 connected to a cloud server in a cloud network, and wherein the actor network comprises a plurality of actors. A distributed virtual machine (DVM) network 204 is connected to the actor network, and wherein the DVM network 204 comprises a plurality of DVMs, and wherein the plurality of actors is connected respectively to the plurality of DVMs based on a predefined protocol, A system server 203 is connected to the cloud server, the actor network and the DVM network 204. A scheduler is provided in the system server to schedule the resources connected to an actor in the actor network. A stop and start mechanism is provided in the server to change a connection between the plurality of actors 202a-202b and the plurality of DVMs. A cloud balancer is provided in the server 203 and connected to the actor in the actor network. The system server 203 sends a message to the actor 202a to disconnect an actor 202a connected to one DVM and to connect the actor 202a to another DVM based on a load of a process agent present in each DVM to balance a load on the actor.

The system server throttles a message queue of an actor to reduce a load on the actor or to enhance the message queue to increase load on the actor.

The scheduler plays a middleware role to synchronously manage a cellular architecture and the actor system, and wherein the cellular architecture is formed with the actor system and the DVM system.

The stop and start mechanism is operated to stop an operation of a process agent in a first DVM and to start an operation of a process agent in a second DVM, when the process agent in the first DVM consumes extra resources, and wherein the start and stop mechanism is operated to execute a cloud balancer application platform to provide a first command to the first DVM to stop the operation of the process agent in the first DVM and a second command to the second DVM to start the operation of the second DVM.

The system server adds three fundamental operations over actor systems to manage schedules, to provide resources and to enable messaging for an asynchronous set of actors in the actor network, and wherein the three fundamental operations includes Perform, Transform and Balance (PTB) operations, and wherein the actors are organized in Actor Sets to realize a protocol, application or data operators that are connected to other actors based on a process composition defined by the PTB operations, and wherein the Perform operation is added to realizes a continuous message routing service, and wherein the Transfer operation is added to define a piped topology and interconnection of two actors in the actor system to provide a continuous service, and wherein the Balance operation is added to define a separation paradigm of service results, and wherein the server uses functional programming and scala to realize perform, transform and balance operations over actor systems.

The scheduler plays a middleware role to synchronously manage an underlying cellular architecture and an overlying actor system.

Figure 4:
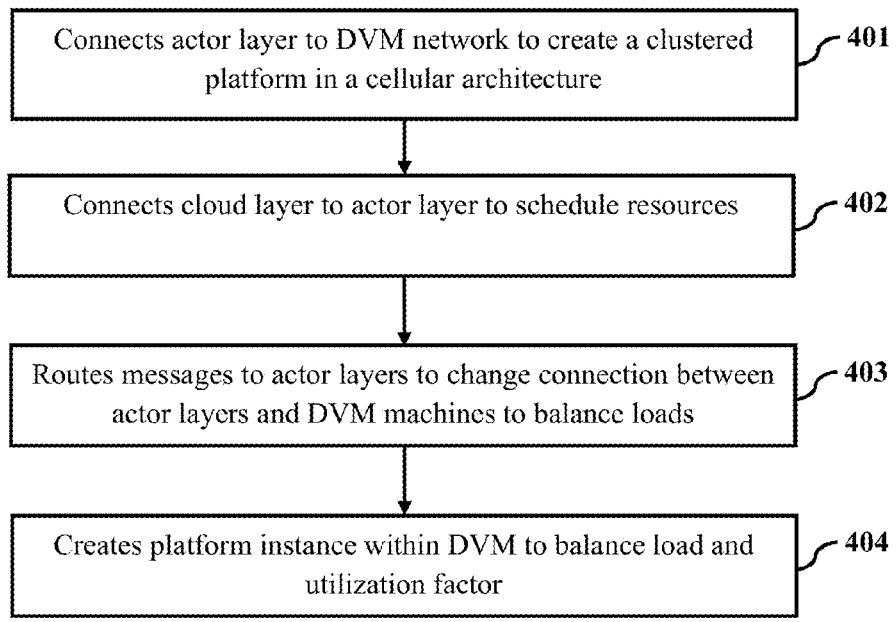
FIG. 4 illustrates a flow chart explaining a method for Big Data processing analytics in a system with actor oriented platform for Big Data processing and analytics, according to an embodiment herein.

FIG. 4 illustrates a flow chart explaining a method for Big Data processing analytics in a system with actor oriented platform for Big Data processing and analytics, according to an embodiment herein.

With respect to FIG. 4, the system adds three fundamental operations over actor systems and the three fundamental operations are Perform/Transform/Balance (PTB) operations. The data actors are organized in Actor Sets realizing a protocol, application or the data operators that are connected to other actors according to the PTB operations defined by a process composition. The Perform operation realizes a continuous service. The Transfer operation defines a piped topology and interconnection of two actor systems that provide a service continuously. The Balance operation defines a separation paradigm of service results. A large process includes a set of Perform/Transform/Balance operations over the actor sets to realize a complete service that is continuous and message passing oriented. The service is a continuous message routing oriented service. The system uses a functional programming and scala to realize perform/transform and balance operations over the actor systems.

An actor layer is connected to DVM network to create a clustered platform in a cellular architecture (401). The system pushes cloud awareness or connects the cloud layer to the actor layer to schedule the resources more flexibly (402). The system uses message routing as the method to balance the loads over the data actors. The method is used to throttle a message queue of an actor to reduce a load or to boost or enhance the message queue to increase the load on the actor. The scheduler plays a middleware role to synchronously manage the underlying cellular architecture and the overlay actor system. The cellular architecture method is to abstract a clustered platform by using the conventional virtualization technologies and a set of interrelated virtual machines namely Distributed Virtual Machines (DVM)s. Each DVM is a part of a set of virtual machines. Each DVM forms a part of a DVM network. The DVMs in the network are operated or deployed or implemented using a cluster topology management protocol (CTPM) for every platform instance.

A method for rebalancing the cloud is not done or executed through the migration of a virtual machine or DVM but is done through actor stop and start mechanism over DVMs. The stop and start mechanism is activated and executed in DVM such that the cloud balancer, as an application on the platform itself, stops a process agent in one DVM and signals another machine (DVM) to instantiate the process agent again when a process agent uses or consumes extra resources. The start and stop mechanism is an application run on the DVM. This model eliminates the need to migrate virtual machine images or processes among DVM. Each actor in this system is prepared or configured to disconnect from one partner and join or connect to another partner to perform or receive the desired service (403). So the underlying layer is capable of adjusting and changing the cluster instance locations asynchronously based on utilization criteria on demand. The system creates a platform instance within existing DVMs to balance a load and increase a utilization factor (404). The other way is to increase an association between the respective computing machines or DVM machines.

An actor involves or deploys or includes different topologies. The method to attach an agent to a topology map is a role based process. An agent chooses a role to attach itself to a topology and dependent roles are resolved through a distributed naming service to manage runtime process architectures more flexibly or dynamically. The dynamic topology mapping or management gives an opportunity to an application to choose the run time structuring method of its processes according to the usage environment.

According to an embodiment herein, a computer implemented method is provided and executed on a computing device to perform Big Data processing in a system with actor oriented platform. According to an embodiment herein, the method comprises establishing an actor network with a plurality of actors and connecting the actor network to a cloud server in a cloud network. A distributed virtual machine (DVM) network is established with a plurality of DVMs and the DVM network is connected to the actor network, and wherein the plurality of actors is connected respectively to the plurality of DVMs based on a predefined protocol. A plurality of resources connected to an actor in the actor network is scheduled by using a scheduler provided in the system server. A connection between the plurality of actors and the plurality of DVMs is changed with a stop and start mechanism provided in the server. A load on the actor is balanced with a cloud balancer provided in the server and wherein the cloud balancer is connected to the actor in the actor network. Three fundamental operations are added over the actor systems using a system server to manage schedules, to provide resources and to enable messaging for an asynchronous set of actors in the actor network.

According to an embodiment herein, the three fundamental operations includes Perform, Transform and Balance (PTB) operations, and wherein the actors are organized in Actor Sets to realize a protocol, application or data operators that are connected to other actors based on a process composition defined by the PTB operations, and wherein the Perform operation is added to realizes a continuous message routing service, and wherein the Transfer operation is added to define a piped topology and interconnection of two actors in the actor system to provide a continuous service, and wherein the Balance operation is added to define a separation paradigm of service results, and wherein the server uses functional programming and scala to realize perform, transform and balance operations over actor systems.

According to an embodiment herein, the method further comprises sending a message to the actor the system server to disconnect an actor connected to one DVM and to connect the actor to another DVM based on a load of a process agent present in each DVM to balance a load on the actor.

According to an embodiment herein, the method further comprises throttling a message queue of an actor to reduce a load on the actor or to enhance the message queue to increase load on the actor using a scheduler.

According to an embodiment herein, a middleware is created by the scheduler to synchronously manage a cellular architecture and the actor system, and wherein the cellular architecture is formed with the actor system and the DVM system.

According to an embodiment herein, the method further comprises executing cloud balancer application to stop an operation of a process agent in a first DVM and to start an operation of a process agent in a second DVM, when the process agent in the first DVM consumes extra resources, and wherein the cloud balancer application is executed to provide a first command to the first DVM to stop the operation of the process agent in the first DVM and a second command to the second DVM to start the operation of the second DVM.

According to an embodiment herein, the method further comprises generating a clustered platform using virtualization technologies and a plurality of DVMs.

According to an embodiment herein, the method further comprises implementing the DVMs using a cluster topology management protocol (CTPM) for every platform instance.

According to an embodiment herein, each actor is disconnect from a respective DVM and connected another DVM to adjust and change cluster instance locations asynchronously on demand based on utilization criteria.

According to an embodiment herein, the method further comprises creating a platform instance within existing DVMs to balance load and increase utilization factor.

According to an embodiment herein, wherein the actor is created to use a plurality of topologies.

According to an embodiment herein, the method further comprises attaching a process agent to a topology map based on a role of the process agent, and wherein the process agent chooses a role to attach to a topology map.

Figure 5:
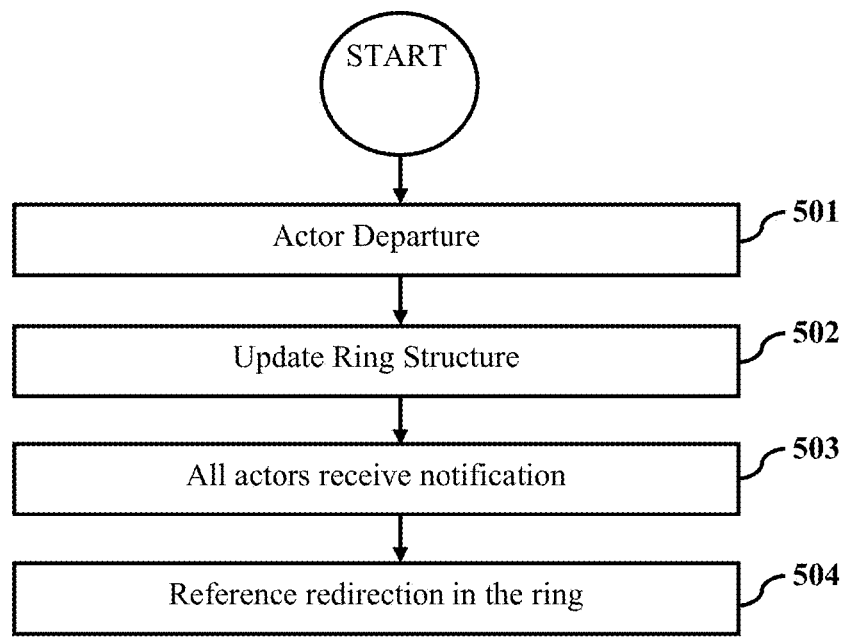
FIG. 5 illustrates a flow chart explaining a method for switching connection between the actors in a ring structure in a Big Data processing and analytics in a system with actor oriented platform, according to an embodiment herein.

FIG. 5 illustrates a flow chart explaining a method for switching connection between the actors in a ring structure in a Big Data processing and analytics in a system with actor oriented platform, according to an embodiment herein. With respect to FIG. 5, The System adds three fundamental operations over actor systems that are Perform/Transform/Balance (PTB) operations. The Data actors are organized in ActorSets realizing a protocol, application or data operators connecting to other actors according to the process composition defined PTB operations. The Perform operation realizes a continuous service. The Transfer operation defines piped topology and interconnection of two actor system that are giving service continuously. The Balance operation defines separation paradigm of service results. A large process includes a set of Perform/Transform/Balance operations over actor sets to realize a complete service that is continuous and message passing oriented. The system uses functional programming and scala to realize perform/transform and balance operations over actor systems (501).

The method used to rebalance the cloud is not done through virtual machine migration, but is done through actor stop and start over DVMs. The stop and start mechanism is that the cloud balancer as an application on the platform itself stops it and signals another machine to instantiate the agent again, when a process agent uses extra resources. This model eliminates the need to migrate virtual machine images. Each actor in this system is prepared to disconnect from a partner and join to another to perform or receive the service. So the underlying layer is capable to adjust and change cluster instance locations based on utilization criteria asynchronously on demand. The system creates a platform instance within existing DVMs to balance load and increase utilization factor. The other way is to increase an association between the machine and DVM machines belonging to. Thus the ring structure comprising eth actors and DVMs are updated (502).

An actor can involve different topologies. The method to attach an agent to a topology map is role based. An agent chooses a role to attach itself to a topology and dependent roles are resolved through a distributed naming service to manage runtime process architectures more flexibly. The topology dynamism gives the opportunity to an application to choose the run time structuring method of its processes according to the usage environment.

The proposed Actor based system supports asynchronous process composition using dynamic binding of data actors through standard message routing interfaces. The Process compositions require flexible interface connectivity and communication transparency and also a dynamic routing configuration between subsystems. This system uses a process dependency definition to define runtime process dependencies. Interfaces have specs to be shared and accessed independent to the actual implementation anywhere and anytime asynchronously with a dependent actor. (503).

Real world deployments of big data analytics have demonstrated that several map-reduce jobs are needed to get desired results from big data. Recent products such as cascading try to solve the problem of task management for Hadoop and legacy software stacks of BigData processing. The product gives the opportunity to reuse running data actors for several applications. (504).

Multistep processes constitute from a set of consecutive map reduce tasks. When data actors goes up, it seeks for module dependencies and process dependencies too. It tries to find required code blocks for execution (Like Hadoop)

beside that it tries to find its process constitutes. It binds class interfaces also messaging interfaces to current topology of the system to reduce process duplication.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A system with actor oriented platform for Big Data processing comprising:
   an actor network connected to a cloud server in a cloud network, and wherein the actor network comprises a plurality of actors;
   a distributed virtual machine (DVM) network connected to the actor network, and wherein the DVM network comprises a plurality of DVMs, and wherein the plurality of actors is connected respectively to the plurality of DVMs based on a predefined protocol;
   a system server connected to the cloud server, the actor network and the DVM network;
   a scheduler provided in the system server to schedule the resources connected to an actor in the actor network;
   a stop and start mechanism provided in the server to change a connection between the plurality of actors and the plurality of DVMs, wherein the stop and start mechanism is operated to stop an operation of a process agent in a first DVM and to start an operation of a process agent in a second DVM, when the process agent in the first DVM consumes extra resources, and wherein the start and stop mechanism is operated to execute a cloud balancer application platform to provide a first command to the first DVM to stop the operation of the process agent in the first DVM and a second command to the second DVM to start the operation of the second DVM;
   and a cloud balancer provided in the server and connected to the actor in the actor network;
   wherein the system server sends a message to the actor to disconnect an actor connected to one DVM and to connect the actor to another DVM based on the load of the process agent present in each DVM to balance the load on the actor, and wherein the server adds three fundamental operations over the actor system to manage schedules, to provide resources and to enable messaging for an asynchronous set of actors in the actor network, and wherein the three fundamental operations includes Perform, Transform and Balance (PTB) operations, and wherein the actors are organized in Actor Sets to realize a protocol, application or data operators that are connected to other actors based on a process composition defined by the PTB operations, and wherein the Perform operation is added to realizes a continuous message routing service, and wherein the Transfer operation is added to define a piped topology and interconnection of two actors in the actor system to provide a continuous service, and wherein the Balance operation is added to define a separation paradigm of service results, and wherein the server uses functional programming and scala to realize perform, transform and balance operations over actor systems.

2. The system according to claim 1, wherein the system server throttles a message queue of the actor to reduce the load on the actor or to enhance the message queue to increase the load on the actor.

3. The system according to claim 1, wherein the scheduler plays a middleware role to synchronously manage a cellular architecture and the actor system, and wherein the cellular architecture is formed with the actor system and the DVM system.

4. The system according to claim 1, wherein the scheduler plays a middleware role to synchronously manage an underlying cellular architecture and an overlying actor system.

5. A computer implemented method executed on a computing device to perform Big Data processing in a system with actor oriented platform, the method comprises:
   establishing an actor network with a plurality of actors and connecting the actor network to a cloud server in a cloud network;
   establishing a distributed virtual machine (DVM) network with a plurality of DVMs and connecting the DVM network to the actor network, and wherein the plurality of actors is connected respectively to the plurality of DVMs based on a predefined protocol;
   scheduling a plurality of resources connected to an actor in the actor network by using a scheduler provided in the system server;
   changing a connection between the plurality of actors and the plurality of DVMs with a stop and start mechanism provided in the server; and
   balancing a load on the actor with a cloud balancer provided in the server and wherein the cloud balancer is connected to the actor in the actor network, and wherein executing the cloud balancer application to stop an operation of a process agent in a first DVM and to start an operation of a process agent in a second DVM, when the process agent in the first DVM consumes extra resources, and wherein the cloud balancer application is executed to provide a first command to the first DVM to stop the operation of the process agent in the first DVM and a second command to the second DVM to start the operation of the second DVM;
   and adding three fundamental operations over actor systems using a system server to manage schedules, to provide resources and to enable messaging for an asynchronous set of actors in the actor network, wherein the three fundamental operations includes Perform, Transform and Balance (PTB) operations, and wherein the actors are organized in Actor Sets to realize a protocol, application or data operators that are connected to other actors based on a process composition defined by the PTB operations, and wherein the Perform operation is added to realizes a continuous message routing service, and wherein the Transfer operation is added to define a piped topology and interconnection of two actors in the actor system to provide a continuous service, and wherein the Balance operation is added to define a separation paradigm of service results, and wherein the server uses functional programming and scala to realize perform, transform and balance operations over actor systems.

6. The method according to claim 5 further comprises sending a message to the actor of the system server to disconnect an actor connected to one DVM and to connect the actor to another DVM based on the load of the process agent present in each DVM to balance the load on the actor.

7. The method according to claim 5, further comprises throttling a message queue of the actor to reduce the load on the actor or to enhance the message queue to increase the load on the actor using a scheduler.

8. The method according to claim 5, wherein a middleware is created by the scheduler to synchronously manage a cellular architecture and the actor system, and wherein the cellular architecture is formed with the actor system and the DVM system.

9. The method according to claim 5 further comprises generating a clustered platform using virtualization technologies and a plurality of DVMs.

10. The method of claim 5, further comprises implementing the DVMs using a cluster topology management protocol (CTPM) for every platform instance.

11. The method of claim 5, wherein each actor is disconnect from a respective DVM and connected to another DVM to adjust and change a cluster instance locations asynchronously on demand based on a utilization criteria.

12. The method of claim 5 further comprises creating a platform instance within existing DVMs to balance the load and increase a utilization factor.

13. The method according to claim 5, wherein the actor is created to use a plurality of topologies.

14. The method according to claim 5 further comprises attaching a process agent to a topology map based on a role of the process agent, and wherein the process agent chooses a role to attach to the topology map.

* * * * *